US009633534B2

(12) United States Patent
Zhevelev

(10) Patent No.: US 9,633,534 B2
(45) Date of Patent: Apr. 25, 2017

(54) DUAL-DETECTOR CAPACITY INTRUSION DETECTION SYSTEMS AND METHODS AND SYSTEMS AND METHODS FOR CONFIGURATION THEREOF

(71) Applicant: Tyco Fire & Security GmbH, Neuhausen am Rheinfall (CH)

(72) Inventor: Boris Zhevelev, Rishon le Zion (IL)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 229 days.

(21) Appl. No.: 14/701,118

(22) Filed: Apr. 30, 2015

(65) Prior Publication Data
US 2015/0325092 A1 Nov. 12, 2015

Related U.S. Application Data

(60) Provisional application No. 61/990,249, filed on May 8, 2014.

(51) Int. Cl.
*H04N 7/18* (2006.01)
*G08B 13/22* (2006.01)
*G08B 13/196* (2006.01)
*G08B 29/22* (2006.01)
*G08B 13/19* (2006.01)

(52) U.S. Cl.
CPC ........ *G08B 13/22* (2013.01); *G08B 13/1968* (2013.01); *G08B 13/19695* (2013.01); *G08B 29/22* (2013.01); *H04N 7/18* (2013.01); *G08B 13/19* (2013.01)

(58) Field of Classification Search
CPC ............... G08B 13/22; G08B 13/1968; G08B 13/19695; G08B 13/19; G08B 29/22; H04N 7/18
USPC ........................................................ 348/155
See application file for complete search history.

(56) References Cited

U.S. PATENT DOCUMENTS

2010/0128446 A1* 5/2010 DiPoala ................ G08B 17/00
361/729

OTHER PUBLICATIONS

Martinez-Martin, et al., "Motion Detection in Static Backgrounds," Robust Motion Detection in Real-Life Scenarios, SpringerBriefs in Computer Science, DOI: 10.10071978-1-4471-4216-4_2, 2012, pp. 5-42. Thirty-nine pages.

(Continued)

Primary Examiner — Allen Wong
(74) Attorney, Agent, or Firm — HoustonHogle LLP

(57) ABSTRACT

A method for automatically orienting passive motion detection sensors in a given area, the method including capturing an image of at least a first portion of the given area, and responsive to capturing of an image of the first portion of the given area, superimposing, onto the image, a multiplicity of virtual passive sensor sensitivity beams virtually originating from at least one passive motion detection sensor, the at least one passive motion detection sensor being operable for passively detecting motion in at least a second portion of the given area, the sensitivity beams demarcating the second portion of the given area, thereby enabling ascertaining a measure of overlap between the first and second portions of the given area.

29 Claims, 6 Drawing Sheets

(56) References Cited

OTHER PUBLICATIONS

"MotionViewer camera DCV200/DCV600/DCV700," Product Specifications Sheet, RSI Video Technologies, 2009. www.videofied.com. Two pages
"The JA-84P wireless motion detector with built-in camera," MHP56103 brochure, Jablotron Ltd., www.jablotron.com, 2010. Two pages.

* cited by examiner

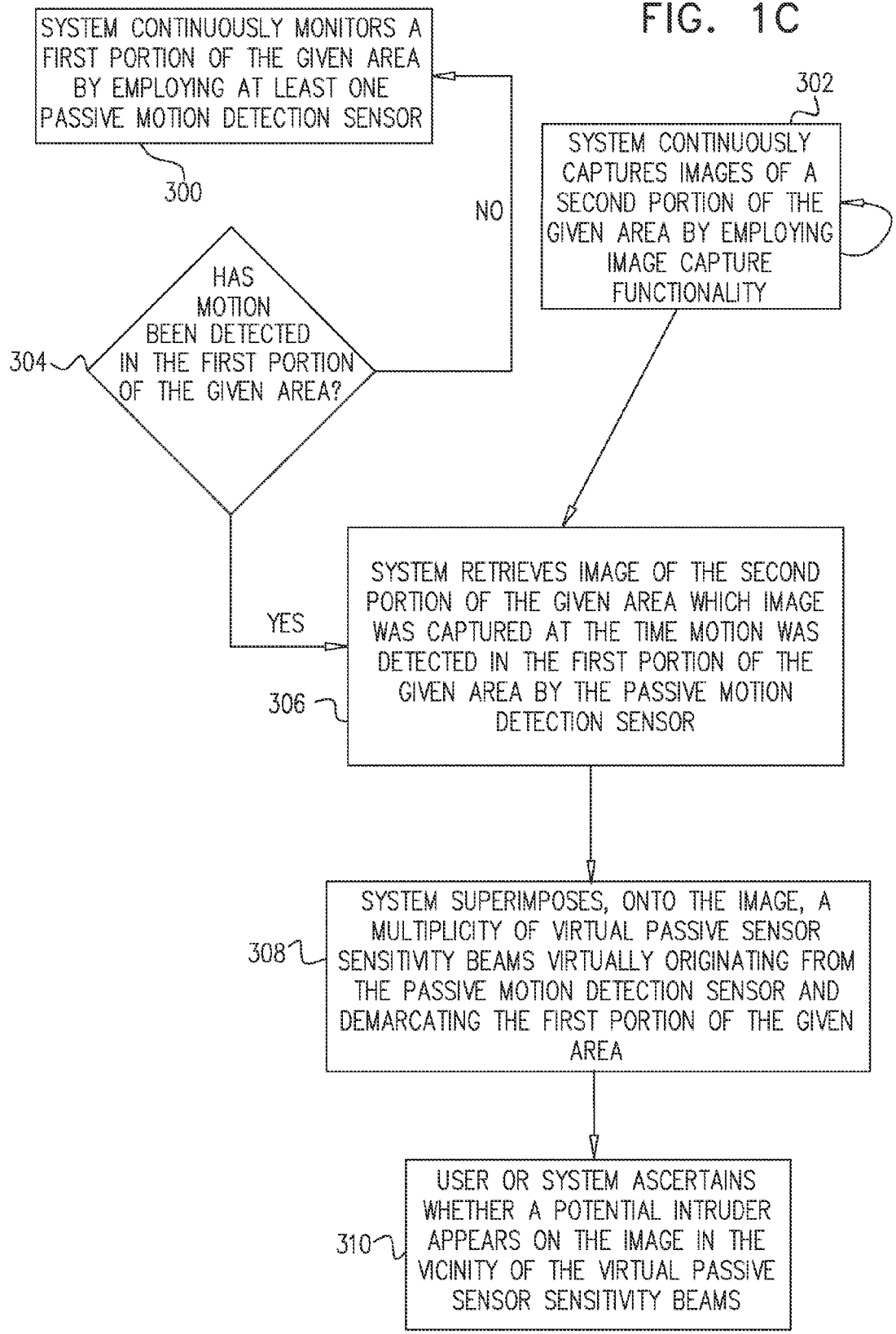

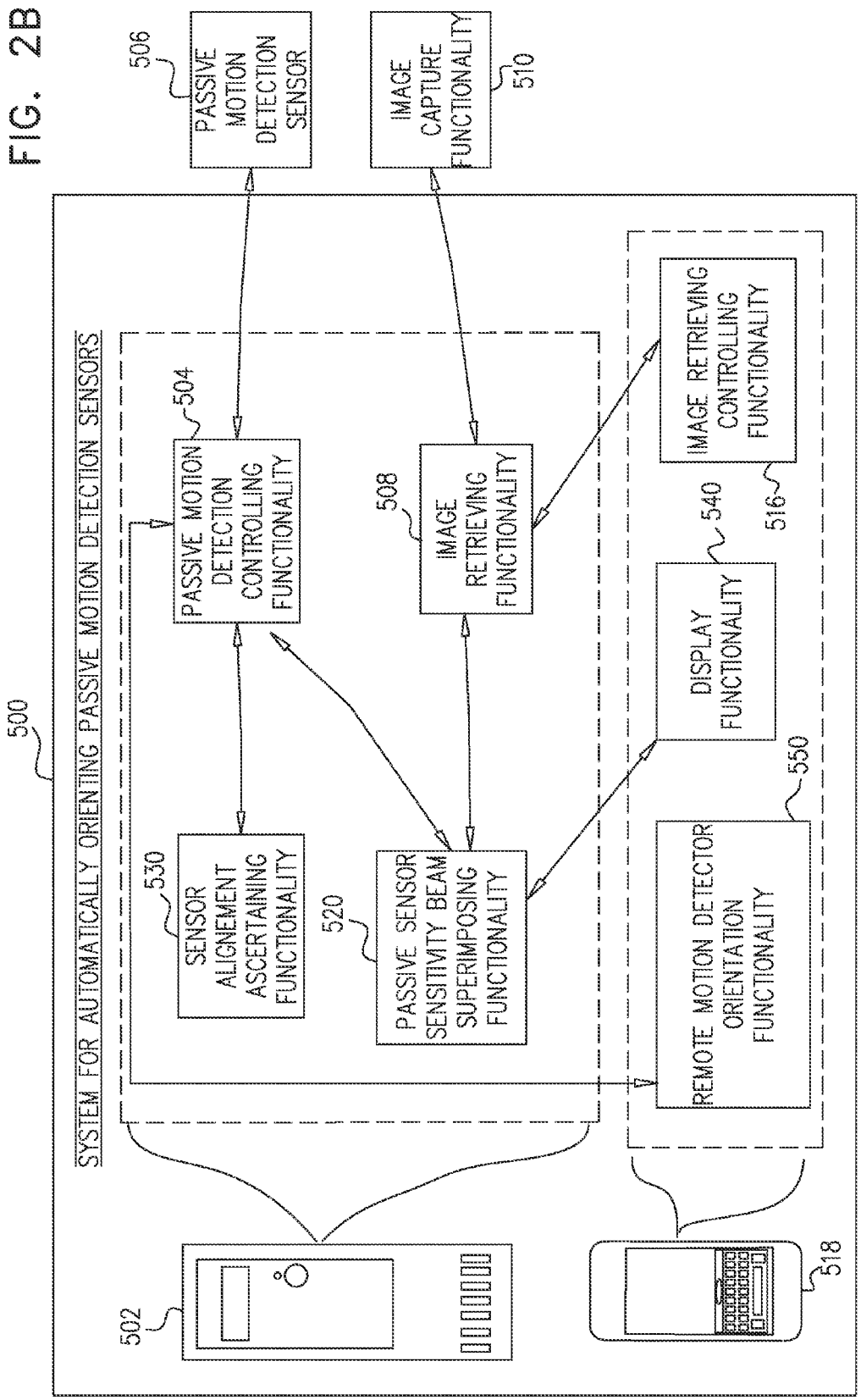

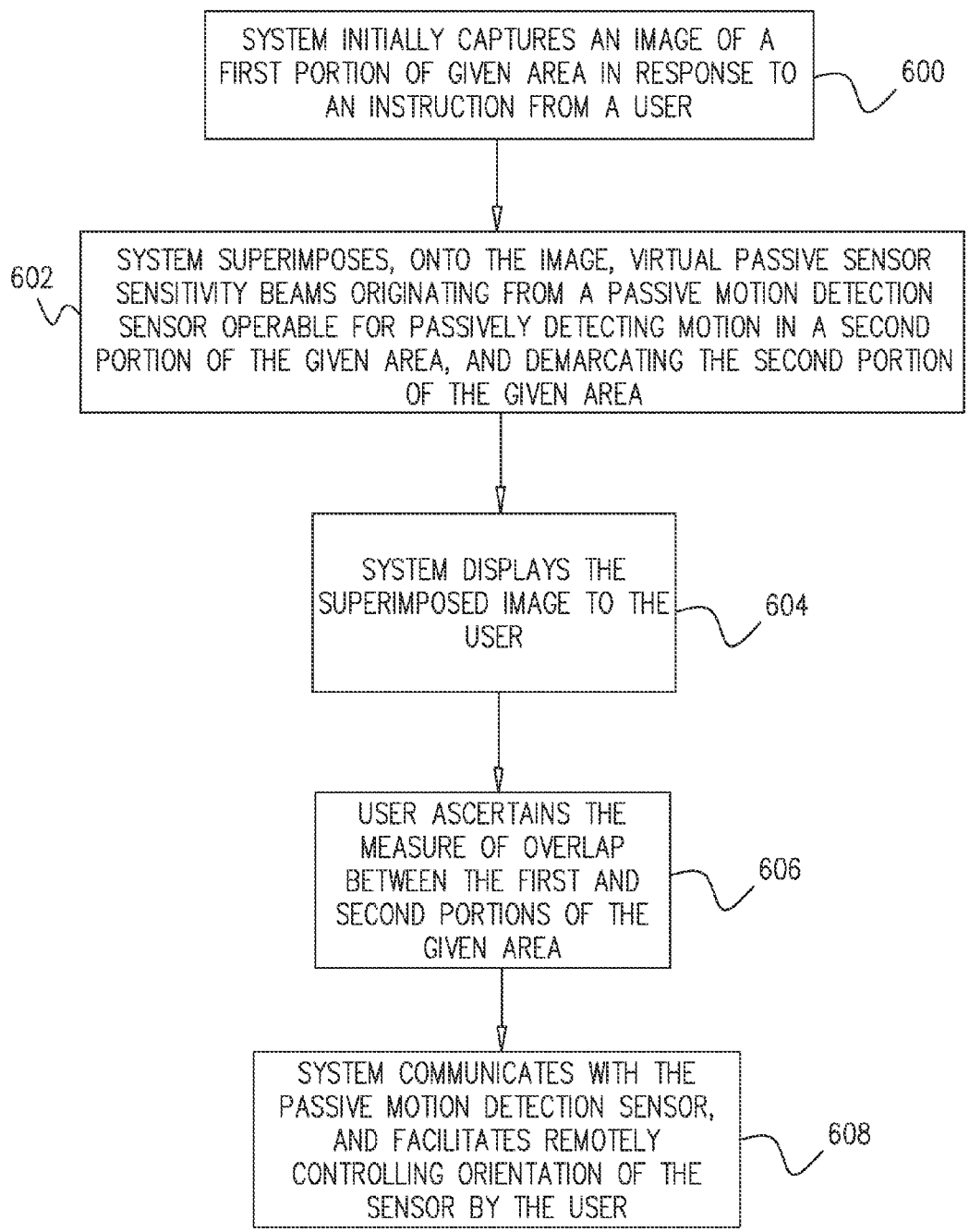

DUAL-DETECTOR CAPACITY INTRUSION DETECTION SYSTEMS AND METHODS AND SYSTEMS AND METHODS FOR CONFIGURATION THEREOF

REFERENCE TO RELATED APPLICATIONS

Reference is made to U.S. Provisional Patent Application Ser. No. 61/990,249, filed May 8, 2014 and entitled "MOTION DETECTION SYSTEM AND METHOD OF VISUAL CONFIGURATION THEREOF", the disclosure of which is hereby incorporated by reference and priority of which is hereby claimed pursuant to 37 CFR 1.78(a) (4) and (5)(i).

FIELD OF THE INVENTION

The present invention relates to dual-detector capacity intrusion detection systems and methods and systems and methods for configuration thereof.

BACKGROUND OF THE INVENTION

Passive motion detectors, such as PIR sensors, have become ubiquitous as part of intrusion detection systems. Upon installing and configuring the sensors, a technician must orientate each sensor in a desired direction. However, verifying the orientation of the sensor is typically difficult and cumbersome, due to the lack of an accessible visual output of the sensor.

Indeed, combinations of cameras and passive motion detectors are commercially available, such as the CAM-242DP commercially available from Shenzhen Shinaian Electronics Technology Co., Ltd. of Shenzhen, China. However the visual output of such a camera is typically accessible to a viewer only at a central monitoring facility which may be remote from the sensor, and is typically not accessible to a technician when installing the sensor. Furthermore, the area monitored by the camera is typically not completely aligned with the area monitored by the passive motion detector.

The present invention seeks to provide an accessible visual output to the technician when installing the sensor, thereby allowing the technician to verify a correct orientation of each sensor upon installation of the sensor.

The present invention also allows employing combinations of cameras and passive motion sensors to increase reliability of the detection capacity thereof.

SUMMARY OF THE INVENTION

The present invention seeks to provide dual-detector capacity intrusion detection systems and methods and systems and methods for configuration thereof.

There is thus provided in accordance with a preferred embodiment of the present invention a dual-detector capacity intrusion detection system including a processor, a memory and a non-transitory, tangible computer-readable medium in which computer program instructions are stored, which instructions, when executed by the processor, cause the computer to provide functionality for detecting a presence of a potential intruder in a given area, the functionality including passive motion detection indication receiving functionality operable for receiving passive motion detection indications from at least one passive motion detection sensor, the at least one passive motion detection sensor being operable for continuously monitoring at least a first portion of the given area and fir passively detecting motion in the at least the first portion of the given area, image retrieving functionality operable for retrieving images from image capture functionality, the image capture functionality being operable for continuously capturing images of at least a second portion of the given area while the at least one passive motion detection sensor is monitoring the first portion of the given area, the first and second portions of the given area being at least partially mutually overlapping, and passive sensor sensitivity beam superimposing functionality operable, responsive to receiving, via the passive motion detection indication receiving functionality, passive motion detection indications indicating detection of motion in the first portion of the given area by the at least one passive motion detection sensor, for retrieving, via the image retrieving functionality, from the image capture functionality, an image of the second portion of the given area, the image being captured at a time corresponding to the detection of motion in the first portion of the given area by the at least one passive motion detection sensor and superimposing, onto the image, a multiplicity of virtual passive sensor sensitivity beams virtually originating from the at least one passive motion detection sensor and demarcating the first portion of the given area, thereby enabling ascertaining whether a potential intruder appears on the image in a vicinity of at least one of the virtual passive sensor sensitivity beams superimposed thereupon.

Preferably, the passive motion detection sensor is a passive infrared (PIR) sensor. Preferably, ascertaining whether a potential intruder appears on the image in a vicinity of at least one of the virtual passive sensor sensitivity beams superimposed thereupon is performed by a user. Preferably, ascertaining whether a potential intruder appears on the image in a vicinity of at least one of the virtual passive sensor sensitivity beams superimposed thereupon is performed by the user in response to receiving a suitable alert from the system.

Preferably, the system also includes automatic dual-capacity intrusion detection functionality operable for automatically analyzing the superimposed image and for automatically ascertaining whether a potential intruder appears on the image in the vicinity of at least one of the virtual passive sensor sensitivity beams superimposed thereupon.

Preferably, the system also includes at least one passive motion detection sensor. Preferably, the system also includes image capture functionality.

There is also provided in accordance with another preferred embodiment of the present invention a dual-detector capacity intrusion detection method for detecting a presence of a potential intruder in a given area, the method including continuously monitoring at least a first portion of the given area by employing at least one passive motion detection sensor to passively detect motion in the first portion of the given area, continuously capturing images of at least a second portion of the given area while monitoring the first portion of the given area, the first and second portions of the given area being at least partially mutually overlapping, and responsive to detection of motion in the first portion of the given area by the at least one passive motion detection sensor retrieving, from the images, an image of the second portion of the given area, the image being captured at a time corresponding to the detection of motion in the first portion of the given area by the at least one passive motion detection sensor and superimposing, onto the image, a multiplicity of virtual passive sensor sensitivity beams virtually originating from the at least one passive motion detection sensor, and demarcating the first portion of the given area, thereby enabling ascertaining whether a potential intruder appears on the image in the vicinity of at least one of the virtual passive sensor sensitivity beams superimposed thereupon.

Preferably, the passive motion detection sensor is a passive infrared (PIR) sensor. Preferably, the method also includes automatically analyzing the superimposed image and automatically ascertaining whether a potential intruder appears on the image in the vicinity of at least one of the virtual passive sensor sensitivity beams superimposed thereupon.

Preferably, ascertaining whether a potential intruder appears on the image in a vicinity of at least one of the virtual passive sensor sensitivity beams superimposed thereupon is performed by a user.

There is further provided in accordance with yet another preferred embodiment of the present invention a system including a processor, a memory and a non-transitory, tangible computer-readable medium in which computer program instructions are stored, which instructions, when executed by the processor, cause the computer to provide functionality for automatically orienting passive motion detection sensors in a given area, the functionality including passive motion detection controlling functionality operable for communicating with and controlling at least one passive motion detection sensor, the at least one passive motion detection sensor being operable for passively detecting motion in at least a first portion of the given area, image retrieving functionality operable for retrieving images from image capture functionality, the image capture functionality being operable for capturing an image of at least a second portion of the given area, and passive sensor sensitivity beam superimposing functionality operable, responsive to retrieving, by the image retrieving functionality, an image of the second portion of the given area captured by the image capture functionality, for employing the passive motion detection controlling functionality to superimpose, onto the image, a multiplicity of virtual passive sensor sensitivity beams virtually originating from at least one passive motion detection sensor, the sensitivity beams demarcating the first portion of the given area, thereby enabling ascertaining a measure of overlap between the first and second portions of the given area.

Preferably, the at least one passive motion detection sensor is a passive infrared (PIR) sensor. Preferably, the system also includes image retrieving controlling functionality operable for remotely controlling the image retrieving functionality by a user located remotely from the system. Preferably, the image retrieving controlling functionality is embodied in a mobile communicator device employed by the user.

Preferably, the measure of overlap between the first and second portions of the given area is indicative of a portion of the first portion of the given area actually monitored by the at least one passive motion detection sensor. Preferably, the system also includes sensor alignment ascertaining functionality operable for automatically ascertaining the measure of overlap between the first and second portions of the given area.

Preferably, the system also includes passive sensor sensitivity beam superimposing functionality, and for displaying the superimposed image of the first portion of the given area to a user, thereby enabling the user to ascertain the measure of overlap between the first and second portions of the given area. Preferably, the display functionality is embodied in a mobile communicator device employed by the user.

Preferably, the system also includes remote motion detector orientation functionality operable, responsive to ascertaining the measure of overlap between the first and second portions of the given area, for communicating with the at least one passive motion detection sensor via the passive motion detection controlling functionality, and for facilitating remotely controlling orientation thereof by a user, the at least one passive motion detection sensor including remote control functionality operable for facilitating remote controlling thereof. Preferably, the remote motion detector orientation functionality is embodied in a mobile communicator device employed by the user.

Preferably, the passive motion detection controlling functionality is also operable, responsive to automatically ascertaining the measure of overlap between the first and second portions of the given area, for automatically remotely controlling orientation thereof, the at least one passive motion detection sensor including remote control functionality operable for facilitating remote controlling thereof.

There is yet further provided in accordance with yet another preferred embodiment of the present invention a method for automatically orienting passive motion detection sensors in a given area, the method including capturing an image of at least a first portion of the given area, and responsive to capturing of an image of the first portion of the given area, superimposing, onto the image, a multiplicity of virtual passive sensor sensitivity beams virtually originating from at least one passive motion detection sensor, the at least one passive motion detection sensor being operable for passively detecting motion in at least a second portion of the given area, the sensitivity beams demarcating the second portion of the given area, thereby enabling ascertaining a measure of overlap between the first and second portions of the given area.

Preferably, the at least one passive motion detection sensor is a passive infrared (PIR) sensor.

Preferably, the measure of overlap between the first and second portions of the given area is indicative of a portion of the first portion of the given area actually monitored by the at least one passive motion detection sensor.

Preferably, the method also includes automatically ascertaining the measure of overlap between the first and second portions of the given area. Preferably, the method also includes displaying the superimposed image of the first portion of the given area to a user, thereby enabling the user to ascertain the measure of overlap between the first and second portions of the given area.

Preferably, the method also includes, responsive to ascertaining the measure of overlap between the first and second portions of the given area, communicating with the at least one passive motion detection sensor, and facilitating remotely controlling orientation thereof by a user, the at least one passive motion detection sensor including remote control functionality operable for facilitating remote controlling thereof.

Additionally or alternatively, the method also includes, responsive to ascertaining the measure of overlap between the first and second portions of the given area, communicating with the at least one passive motion detection sensor and automatically remotely controlling orientation thereof, the at least one passive motion detection sensor including remote control functionality operable for facilitating remote controlling thereof.

BRIEF DESCRIPTION OF THE DRAWINGS

The present invention will be understood and appreciated more fully from the following detailed description taken in conjunction with the drawings in which:

FIG. 1C is a simplified flowchart of the operation of the system of FIG. 1A;

FIG. 2B is a simplified functional block diagram of the system illustrated in FIG. 2A; and FIG. 2C is a simplified flowchart of the operation of the system of FIG. 2A.

DETAILED DESCRIPTION OF PREFERRED EMBODIMENTS

Figure 1A:
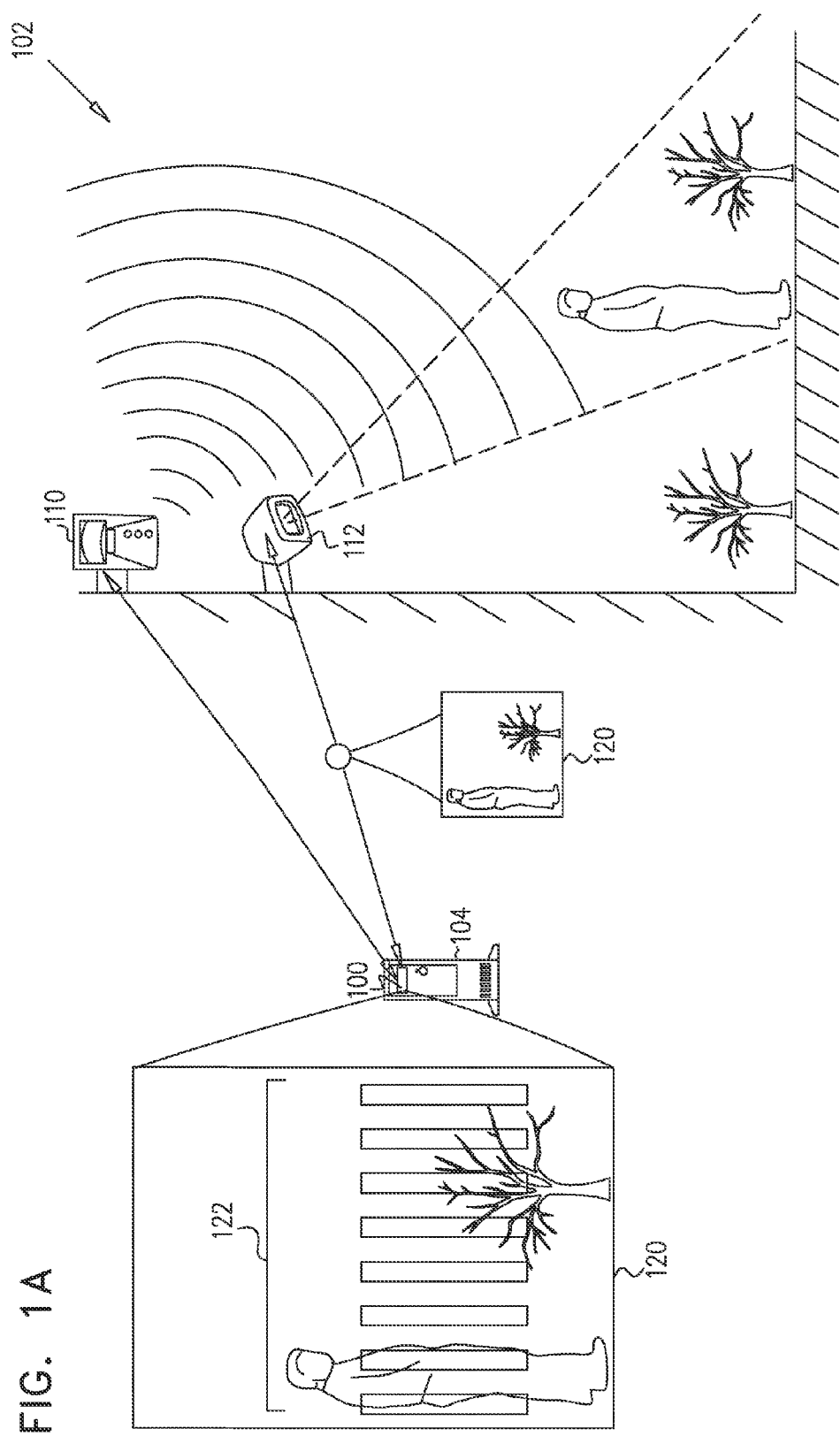
FIG. 1A is a simplified pictorial illustration of a dual-detector capacity intrusion detection system, constructed and operative in accordance with a preferred embodiment of the present invention.

Reference is now made to FIG. 1A, which is a simplified pictorial illustration of a dual-detector capacity intrusion detection system, constructed and operative in accordance with a preferred embodiment of the present invention.

As shown in FIG. 1A, dual-detector capacity intrusion detection system 100 is provided for detecting a presence of a potential intruder in an area 102. Area 102 may be, for example, an exterior perimeter of a premises protected by system 100 or a restricted area governed, inter alia, by system 100. The system 100 of FIG. 1A is preferably embodied in a computer product which preferably resides on a computer 104. Computer 104 preferably includes a processor, a memory and a non-transitory, tangible computer-readable medium, such as a computer hard disk, in which computer program instructions are stored.

System 100 is preferably operable for receiving passive motion detection indications from at least one passive infrared (PIR) sensor 110. Sensor 110 is preferably operable for continuously monitoring and passively detecting motion in at least part of area 102.

System 100 is also (preferably operable for retrieving images from image capture functionality such as, for example, a camera 112. Camera 112 is preferably operable for capturing images of at least part of area 102, the parts of area 102 monitored by sensor 110 and by camera 112 being at least partially mutually overlapping. It is appreciated that camera 112 is preferably activated only while sensor 110 is activated.

It is a particular feature of this embodiment of the present invention that system 100 is operable, responsive to receiving, from PIR sensor 110, a passive motion detection indication indicative of motion in area 102, for:

retrieving, from camera 112, an image 120 of area 102, image 120 being captured at a time corresponding to the detection of motion in area 102 by PIR sensor 110, and superimposing, onto image 120, a multiplicity of virtual PIR sensitivity beams 122 virtually originating from PIR sensor 110 and demarcating the part of area 102 monitored by PIR sensor 110, thereby enabling ascertaining whether a potential intruder appears on image 120 in the vicinity of at least one of virtual PIR sensitivity beams 122 superimposed onto image 120. It is appreciated that ascertaining the appearance of a potential intruder on superimposed image 120 may be achieved by a user responsible for monitoring system 100, preferably in response to receiving a suitable alert from system 100.

It is a further particular feature of this embodiment of the present invention that system 100 is preferably additionally or alternatively operable for automatically analyzing superimposed image 120 and for automatically ascertaining whether a potential intruder appears in the vicinity of at least one of virtual PIR sensitivity beams 122 superimposed onto image 120.

It is appreciated that the dual-detector capacity of system 100 combined with the aforementioned functionality of enabling ascertaining appearance of a potential intruder on image 120 superimposed with PIR sensitivity beams 122 and demarcating at least a part of area 102 monitored by PIR sensor 110 is operative for increasing the reliability of the intrusion detection capabilities of system 100.

Figure 1B:
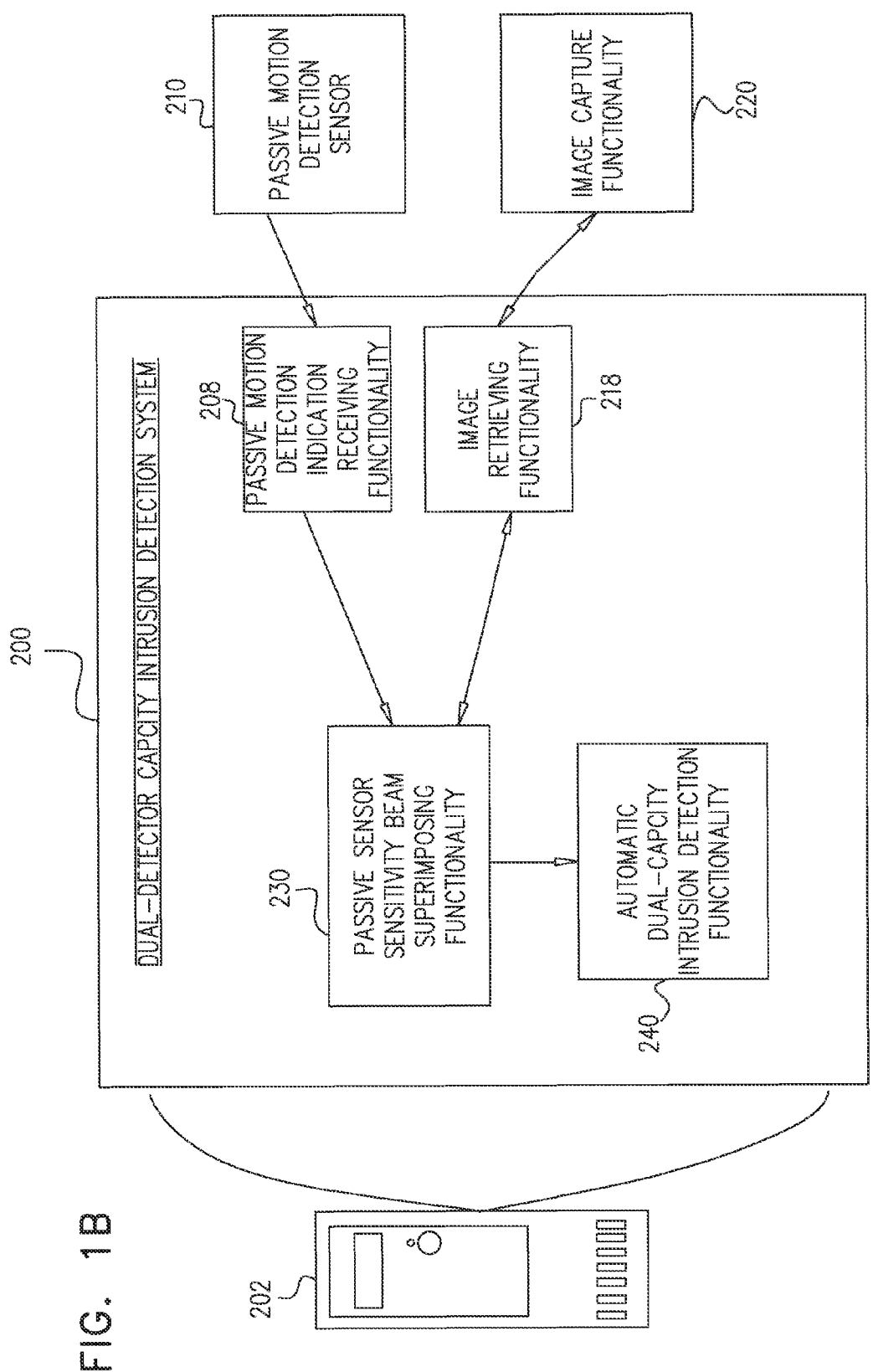
FIG. 1B is a simplified functional block diagram of the system illustrated in FIG. 1A.

Reference is now made to FIG. 1B, which is a simplified functional block diagram of the system illustrated in FIG. 1A. Dual-detector capacity intrusion detection system 200 is preferably embodied in a computer product which preferably resides on a computer 202. Computer 202 preferably includes a processor, a memory and a non-transitory, tangible computer-readable medium, such as a computer hard disk, in which computer program instructions are stored.

As shown in FIG. 1B, dual-detector capacity intrusion detection system 200 preferably includes passive motion detection indication receiving functionality 208 operable for receiving passive motion detection indications from at least one passive motion detection sensor 210. Passive motion detection sensor 210 is preferably operable for continuously monitoring at least a first portion of a given area and for passively detecting motion in at least the first portion of the given area. Passive motion detection sensor 210 may be, for example a passive infrared (PIR) sensor or any other suitable passive motion detection sensor capable of detection motion in an area monitored thereby.

System 200 also preferably includes image retrieving functionality 218 operable for retrieving images from image capture functionality 220. Image capture functionality 220 is preferably operable for capturing images of at least a second portion of the given area, the first and second portions of the given area being at least partially mutually overlapping. As described hereinabove with reference to FIG. 1A, image capture functionality 220 may be, for example, a camera, such as camera 112. It is appreciated that camera 112 is preferably activated only while passive motion detection sensor 210 is activated.

System 200 yet further preferably includes passive sensor sensitivity beam superimposing functionality 230 operable, responsive to receiving, via passive motion detection indication receiving functionality 208, passive motion detection indications indicating detection of motion in at least the first portion of the given area by at least one passive motion detection sensor 210, for:

retrieving, via image retrieving functionality 218, from image capture functionality 220, an image of at least the second portion of the given area, the image being captured at a time corresponding to the detection of motion in at least the first portion of the given area by at least one passive motion detection sensor 210, and superimposing, onto the image, a multiplicity of virtual passive sensor sensitivity beams virtually originating from at least one passive motion detection sensor 210 and demarcating at least the first portion of the given area, thereby enabling ascertaining whether a potential intruder appears on the image in the vicinity of at least one of the virtual passive sensor sensitivity beams superimposed thereupon. It is appreciated that ascertaining whether a potential intruder appears on the image in the vicinity of at least one of the virtual passive sensor sensitivity beams superimposed thereupon, is preferably in response to receiving a suitable alert from system 200.

System 200 also preferably includes automatic dual-capacity intrusion detection functionality 240 operable for automatically analyzing the superimposed image and for automatically ascertaining whether a potential intruder appears on the image in the vicinity of at least one of the virtual passive sensor sensitivity beams superimposed thereupon. Automatic dual-capacity intrusion detection functionality 240 preferably also resides on computer 202.

Reference is now made to FIG. 1C, which is a simplified flowchart of the operation of the system of FIG. 1A. As shown in FIG. 1C, the system continuously monitors at least a first portion of the given area by employing at least one passive motion detection sensor to passively detect motion in at least the first portion of the given area (300) and continuously captures images of at least a second portion of the given area by employing image capture functionality (302). It is appreciated that the first and second portions of the given area are at least partially mutually overlapping. The passive motion detection sensor may be, for example, a passive infrared (PIR) sensor, and the image capture functionality may be, for example, a camera. It is appreciated that the camera is preferably activated only while the PIR sensor is activated.

Responsive to detection of motion in at least the first portion of the given area by the at least one passive motion detection sensor (304) the system preferably retrieves an image of at least the second portion of the given area (306), the image being captured at a time corresponding to the detection of motion in at least the first portion of the given area by the at least one passive motion detection sensor.

Thereafter, the system preferably superimposes, onto the image, a multiplicity of virtual passive sensor sensitivity beams virtually originating from the at least one passive motion detection sensor and demarcating at least the first portion of the given area (308), thereby enabling ascertaining whether a potential intruder appears on the image in the vicinity of at least one of the virtual passive sensor sensitivity beams superimposed thereupon (310).

It is appreciated that ascertaining whether a potential intruder appears on the image in the vicinity of at least one of the virtual passive sensor sensitivity beams superimposed on the image may be performed either automatically or by a user.

Figure 2A:
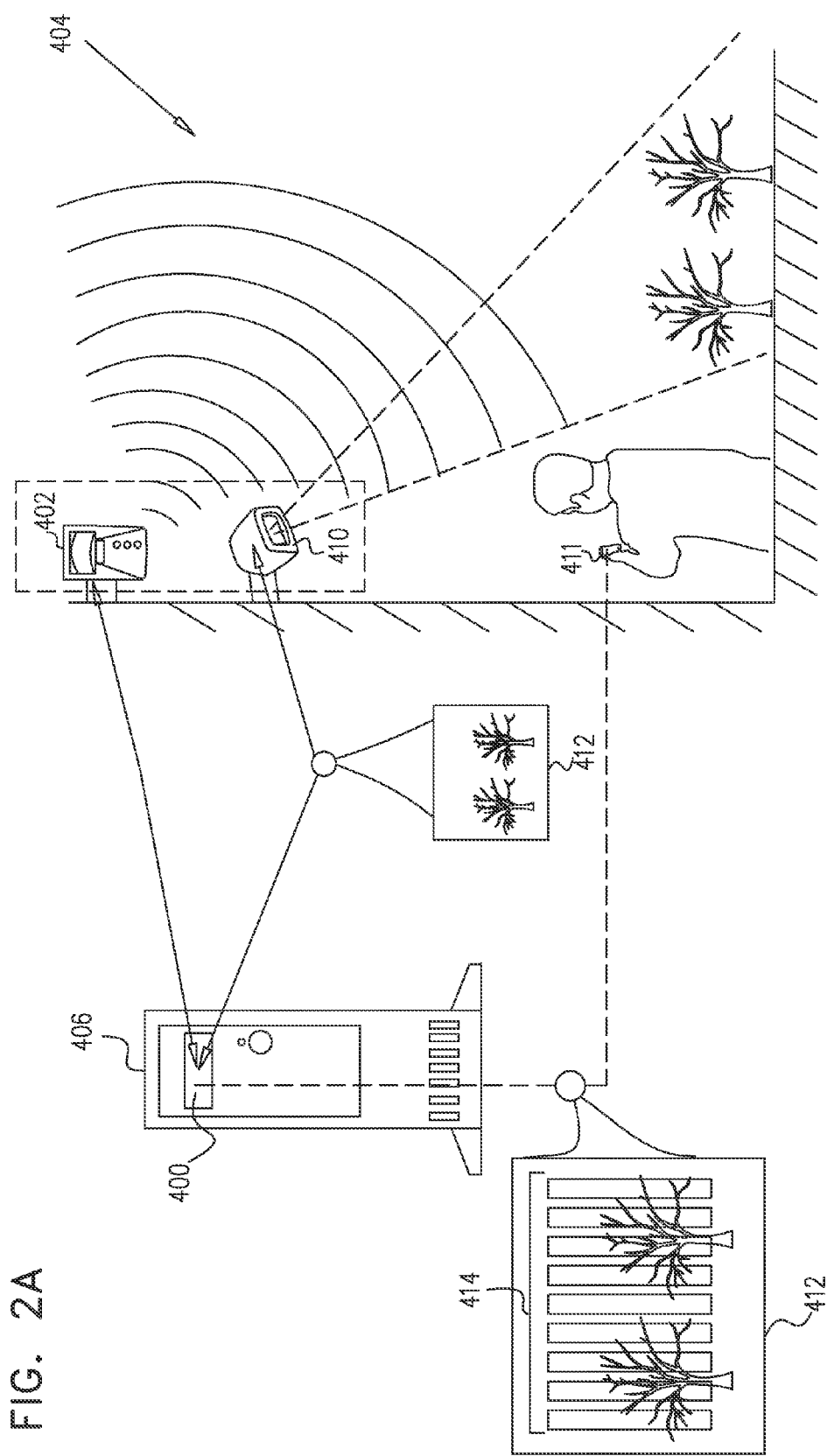
FIG. 2A is a simplified pictorial illustration of a system fir automatically orienting passive motion detection sensors, constructed and operative in accordance with another preferred embodiment of the present invention.

Reference is now made to FIG. 2A, which is a simplified pictorial illustration of a system for automatically orienting passive motion detection sensors, constructed and operative in accordance with another preferred embodiment of the present invention.

As shown in FIG. 2A, a system 400 for automatically orienting passive motion detection sensors is provided for automatically orienting passive motion detection sensors 402 monitoring at least part of an area 404. Passive motion detection sensors 402 may be, for example, passive infrared (PIR) sensors. Sensors 402 preferably include remote control functionality operable for facilitating remote controlling thereof. System 400 is typically employed by a technician responsible for installing and configuring passive motion detection sensors 402. While employing system 400, the technician is typically located in the vicinity of sensors 402 and remotely from system 400.

System 400 is preferably embodied in a computer product which preferably resides, for example, on a suitable computer 406. Computer 406 preferably includes a processor, a memory and a non-transitory, tangible computer-readable medium, such as a computer hard disk, in which computer program instructions are stored. System 400 is preferably connected to a network, such as a LAN or a WAN, thereby enabling remote communication therewith.

Area 404 may be, for example, an exterior perimeter of a premises protected by passive motion detection sensors 402 or a restricted area governed, inter alia, by passive motion detection sensors 402. It is appreciated that system 400 may be an integral part of an intrusion detection system comprising passive motion detection sensors 402.

System 400 is preferably operable for retrieving images from image capture functionality such as, for example, a camera 410, operable for capturing images of at least part of area 404, the parts of area 404 monitored by sensors 402 and visible to camera 410 typically being at least partially mutually overlapping. Camera 410 may be housed with at least one of sensors 402.

A dedicated mobile communicator application installed on a mobile communicator 411 employed by the technician responsible for installing and configuring passive motion detection sensors 402 is preferably provided for communicating with system 400 and for thereby controlling camera 410. Communication between mobile communicator 411 and system 400 may be achieved, for example, via an internet connection provided by a service provider providing internet service to mobile communicator 411.

It is a particular feature of this embodiment of the present invention that system 400 is operable, responsive to retrieving an image 412 of at least part area 404 captured by camera 410, for superimposing, onto image 412, a multiplicity of virtual passive sensor sensitivity beams 414 virtually originating from at least one of sensors 402 and demarcating a part of area 404 monitored by sensor 402, thereby enabling ascertaining a measure of overlap between the area 404 monitored by sensor 402 and the portion of area 404 visible to camera 410. It is appreciated that this measure of overlap between the area 404 monitored by sensor 402 and the portion of area 404 visible to camera 410 is indicative of the portion of area 404 visible to camera 410 which is actually monitored by sensor 402.

Display functionality, preferably provided by the dedicated mobile communicator application installed on mobile communicator 411 employed by the technician, is preferably provided for displaying superimposed image 412 of at least first portion of the given area retrieved from camera 410 to the technician, thereby enabling the technician to visually ascertain the measure of overlap between the area 404 monitored by sensor 402 and the portion of area 404 visible to camera 410.

The dedicated mobile communicator application installed on mobile communicator 411 is also preferably operable for communicating with sensors 402 via system 400, and for facilitating remotely controlling orientation thereof by the technician. It is a particular feature of this embodiment of the present invention that this combination of providing a measure of the overlap between the area 404 monitored by sensor 402 and the portion of area 404 visible to camera 410 and facilitating remote control of the orientation of sensors 402 is operative to allow the technician to align sensors 402 to monitor a desired portion of area 404 visible to camera 410. Remote control of sensors 402 further allows the technician to disable any of sensors 402 in a case, for example, where aligning of the sensor with a desired portion of area 404 visible to camera 410 is not possible.

It is appreciated that ascertaining of the measure of overlap between the area 404 monitored by sensor 402 and the portion of area 404 visible to camera 410 may be additionally or alternatively achieved automatically by system 400, by employing suitable image analysis techniques. Responsive thereto, system 400 may also be operative to automatically remote control orientation of sensors 402 to monitor a desired portion of area 404 visible to camera 410.

Reference is now made to FIG. 2B, which is a simplified functional block diagram of the system illustrated in FIG. 2A. As shown in FIG. 2B, the system 500 for automatically orienting passive motion detection sensors in a given area is preferably embodied in a computer product which preferably resides on a computer 502. Computer 502 preferably includes a processor, a memory and a non-transitory, tangible computer-readable medium, such as a computer hard disk, in which computer program instructions are stored.

System 500 preferably includes passive motion detection controlling functionality 504 operable for communicating with and controlling at least one passive motion detection sensor 506. Sensor 506 may be, for example, passive infrared (PIR) sensors, and is preferably operable for passively detecting motion in at least a first portion of the given area.

System 500 preferably also includes image retrieving functionality 508 operable for retrieving images from image capture functionality 510. Image capture functionality 510 is preferably operable for capturing an image of at least a second portion of the given area. It is appreciated that system 500 preferably includes image retrieving controlling functionality 516 operable for remotely controlling image retrieving functionality 508 by a technician responsible for installing and configuring passive motion detection sensors 506. While employing system 500, the technician is typically located in the vicinity of sensors 506 and remotely from system 500. Image retrieving controlling functionality 516 preferably resides on a mobile communicator 518 employed by the technician.

System 500 preferably further includes passive sensor sensitivity beam superimposing functionality 520 operable, responsive to retrieving, via image retrieving functionality 508, an image of at least the second portion of the given area captured by image capture functionality 510, for employing passive motion detection controlling functionality 504 to superimpose, onto the image, a multiplicity of virtual passive sensor sensitivity beams virtually originating from at least one passive motion detection sensor 506.

The sensitivity beams preferably demarcate at least the first portion of the given area, thereby enabling ascertaining a measure of overlap between the first and second portions of the given area. It is appreciated that this measure of overlap between the first and second portions of the given area is indicative of the portion of the given area which is actually monitored by sensor 506.

System 500 may also include sensor alignment ascertaining functionality 530 operable for automatically ascertaining the measure of overlap between the first and second portions of the given area. As described hereinabove with regard to FIG. 2A, it is appreciated that automatically ascertaining the measure of overlap between the first and second portions of the given area may be achieved by employing suitable image analysis techniques.

System 500 preferably also includes display functionality 540, operable for communicating with passive sensor sensitivity beam superimposing functionality 520, and for displaying the superimposed image of at least the first portion of the given area to the technician, thereby enabling the technician to ascertain the measure of overlap between the first and second portions of the given area. Display functionality 540 preferably resides on mobile communicator 518 employed by the technician.

Remote motion detector orientation functionality 550 is preferably provided for communicating with sensor 506 via passive motion detection controlling functionality 504 and, responsive to ascertaining the measure of overlap between the first and second portions of the given area, for facilitating remotely controlling orientation of sensor 506 by the technician, sensor 506 preferably including remote control functionality operable for facilitating remote controlling thereof.

Passive motion detection controlling functionality 504 may also be operable, responsive to automatically ascertaining the measure of overlap between the first and second portions of the given area by sensor alignment ascertaining functionality 530, for automatically remotely controlling orientation of sensor 506, responsive to automatically ascertaining the measure of overlap between the first and second portions of the given area.

Reference is now made to FIG. 2C, which is a simplified flowchart of the operation of the system of FIG. 2A. As shown in FIG. 2C, the system initially captures an image of at least a first portion of the given area (600), preferably in response to an instruction from a user. Thereafter, the system preferably superimposes, onto the image, a multiplicity of virtual passive sensor sensitivity beams (602). As described hereinabove, the beams preferably virtually originate from at least one passive motion detection sensor operable for passively detecting motion in at least a second portion of the given area, and preferably demarcate at least the second portion of the given area.

Thereafter, the system preferably displays the superimposed image of at least the first portion of the given area to the user (604), thereby enabling the user to ascertain the measure of overlap between the first and second portions of the given area. It is appreciated that the measure of overlap between the first and second portions of the given area is indicative of a portion of the first portion of the given area actually monitored by the at least one passive motion detection sensor.

Responsive to ascertaining, by the user, the measure of overlap between the first and second portions of the given area (606), the system, communicating with the at least one passive motion detection sensor, facilitates remotely controlling orientation of the sensor by the user (608). It is appreciated that the at least one passive motion detection sensor preferably includes remote control functionality operable for facilitating remote controlling thereof.

It is appreciated that, additionally or alternatively, the system may automatically ascertain the measure of overlap between the first and second portions of the given area, and may automatically remotely control the orientation thereof.

It will be appreciated by persons skilled in the art that the present invention is not limited by what has been particularly shown and described hereinabove. Rather the scope of the present invention includes both combinations and sub-combinations of the various features described hereinabove as well as modifications thereof which would occur to persons skilled in the art upon reading the foregoing description and which are not in the prior art.

The invention claimed is:

1. A dual-detector capacity intrusion detection system comprising a processor, a memory and a non-transitory, tangible computer-readable medium in which computer program instructions are stored, which instructions, when executed by said processor, cause the computer to provide functionality for detecting a presence of a potential intruder in a given area, said functionality comprising:

passive motion detection indication receiving functionality operable for receiving passive motion detection indications from at least one passive motion detection sensor, said at least one passive motion detection sensor being operable for continuously monitoring at least a first portion of said given area and for passively detecting motion in said at least said first portion of said given area;

image retrieving functionality operable for retrieving images from image capture functionality, said image capture functionality being operable for capturing images of at least a second portion of said given area while said at least one passive motion detection sensor is monitoring said at least said first portion of said given area, said first and second portions of said given area being at least partially mutually overlapping; and passive sensor sensitivity beam superimposing functionality operable, responsive to receiving, via said passive motion detection indication receiving functionality, passive motion detection indications indicating detection of motion in said at least said first portion of said given area by said at least one passive motion detection sensor, for:

retrieving, via said image retrieving functionality, from said image capture functionality, an image of said at least said second portion of said given area, said image being captured at a time corresponding to said detection of motion in said at least said first portion of said given area by said at least one passive motion detection sensor; and superimposing, onto said image, a multiplicity of virtual passive sensor sensitivity beams virtually originating from said at least one passive motion detection sensor and demarcating said at least said first portion of said given area, thereby enabling ascertaining whether a potential intruder appears on said image in a vicinity of at least one of said virtual passive sensor sensitivity beams superimposed thereupon.

2. A dual-detector capacity intrusion detection system according to claim 1 and wherein said passive motion detection sensor is a passive infrared (PIR) sensor.

3. A dual-detector capacity intrusion detection system according to claim 1 and wherein said ascertaining whether a potential intruder appears on said image in a vicinity of at least one of said virtual passive sensor sensitivity beams superimposed thereupon is performed by a user.

4. A dual-detector capacity intrusion detection system according to claim 3 and wherein said ascertaining whether a potential intruder appears on said image in a vicinity of at least one of said virtual passive sensor sensitivity beams superimposed thereupon is performed by said user in response to receiving a suitable alert from said system.

5. A dual-detector capacity intrusion detection system according to claim 1 and also comprising automatic dual-capacity intrusion detection functionality operable for automatically analyzing said superimposed image and for automatically ascertaining whether a potential intruder appears on said image in the vicinity of at least one of said virtual passive sensor sensitivity beams superimposed thereupon.

6. A dual-detector capacity intrusion detection system according to claim 1 and also comprising said at least one passive motion detection sensor.

7. A dual-detector capacity intrusion detection system according to claim 1 and also comprising said image capture functionality.

8. A dual-detector capacity intrusion detection method for detecting a presence of a potential intruder in a given area, said method comprising:

continuously monitoring at least a first portion of said given area by employing at least one passive motion detection sensor to passively detect motion in said at least said first portion of said given area;

capturing images of at least a second portion of said given area while said monitoring said at least said first portion of said given area, said first and second portions of said given area being at least partially mutually overlapping; and responsive to detection of motion in said at least said first portion of said given area by said at least one passive motion detection sensor:

retrieving, from said images, an image of said at least said second portion of said given area, said image being captured at a time corresponding to said detection of motion in said at least said first portion of said given area by said at least one passive motion detection sensor; and superimposing, onto said image, a multiplicity of virtual passive sensor sensitivity beams virtually originating from said at least one passive motion detection sensor and demarcating said at least said first portion of said given area, thereby enabling ascertaining whether a potential intruder appears on said image in the vicinity of at least one of said virtual passive sensor sensitivity beams superimposed thereupon.

9. A dual-detector capacity intrusion detection method according to claim 8 and wherein said passive motion detection sensor is a passive infrared (PIR) sensor.

10. A dual-detector capacity intrusion detection method according to claim 8 and also comprising automatically analyzing said superimposed image and automatically ascertaining whether a potential intruder appears on said image in the vicinity of at least one of said virtual passive sensor sensitivity beams superimposed thereupon.

11. A dual-detector capacity intrusion detection method according to claim 8 and wherein said ascertaining whether a potential intruder appears on said image in a vicinity of at least one of said virtual passive sensor sensitivity beams superimposed thereupon is performed by a user.

12. A system comprising a processor, a memory and a non-transitory, tangible computer-readable medium in which computer program instructions are stored, which instructions, when executed by said processor, cause the computer to provide functionality for automatically orienting passive motion detection sensors in a given area, said functionality comprising:

passive motion detection controlling functionality operable for communicating with and controlling at least one passive motion detection sensor, said at least one passive motion detection sensor being operable for passively detecting motion in at least a first portion of said given area;

image retrieving functionality operable for retrieving images from image capture functionality, said image capture functionality being operable for capturing an image of at least a second portion of said given area; and passive sensor sensitivity beam superimposing functionality operable, responsive to retrieving, by said image retrieving functionality, an image of said at least said second portion of said given area captured by said image capture functionality, for employing said passive motion detection controlling functionality to superimpose, onto said image, a multiplicity of virtual passive sensor sensitivity beams virtually originating from at least one passive motion detection sensor, said sensitivity beams demarcating said at least said first portion of said given area, thereby enabling ascertaining a measure of overlap between said first and second portions of said given area.

13. A system according to claim 12 and wherein said at least one passive motion detection sensor is a passive infrared (PIR) sensor.

14. A system according to claim 12 and also comprising image retrieving controlling functionality operable for remotely controlling said image retrieving functionality by a user located remotely from said system.

15. A system according to claim 14 and wherein said image retrieving controlling functionality is embodied in a mobile communicator device employed by said user.

16. A system according to claim 12 and wherein said measure of overlap between said first and second portions of said given area is indicative of a portion of said first portion of said given area actually monitored by said at least one passive motion detection sensor.

17. A system according to claim 12 and also comprising sensor alignment ascertaining functionality operable for automatically ascertaining said measure of overlap between said first and second portions of said given area.

18. A system according to claim 17 and wherein said passive motion detection controlling functionality is also operable, responsive to said automatically ascertaining said measure of overlap between said first and second portions of said given area, for automatically remotely controlling orientation thereof, said at least one passive motion detection sensor comprising remote control functionality operable for facilitating remote controlling thereof.

19. A system according to claim 12 and also comprising:
display functionality, operable for communicating with said passive sensor sensitivity beam superimposing functionality, and for displaying said superimposed image of said at least said first portion of said given area to a user, thereby enabling said user to ascertain said measure of overlap between said first and second portions of said given area.

20. A system according to claim 19 and wherein said display functionality is embodied in a mobile communicator device employed by said user.

21. A system according to claim 12 and also comprising remote motion detector orientation functionality operable, responsive to said ascertaining said measure of overlap between said first and second portions of said given area, for communicating with said at least one passive motion detection sensor via said passive motion detection controlling functionality, and for facilitating remotely controlling orientation thereof by a user, said at least one passive motion detection sensor comprising remote control functionality operable for facilitating remote controlling thereof.

22. A system according to claim 21 and wherein said remote motion detector orientation functionality is embodied in a mobile communicator device employed by said user.

23. A method for automatically orienting passive motion detection sensors in a given area, said method comprising:
capturing an image of at least a first portion of said given area; and
responsive to said capturing of an image of said at least said first portion of said given area, superimposing, onto said image, a multiplicity of virtual passive sensor sensitivity beams virtually originating from at least one passive motion detection sensor, said at least one passive motion detection sensor being operable for passively detecting motion in at least a second portion of said given area, said sensitivity beams demarcating said at least said second portion of said given area, thereby enabling ascertaining a measure of overlap between said first and second portions of said given area.

24. A method for automatically orienting passive motion detection sensors according to claim 23 and wherein said at least one passive motion detection sensor is a passive infrared (PIR) sensor.

25. A method for automatically orienting passive motion detection sensors according to claim 23 and wherein said measure of overlap between said first and second portions of said given area is indicative of a portion of said first portion of said given area actually monitored by said at least one passive motion detection sensor.

26. A method for automatically orienting passive motion detection sensors according to claim 23 and also comprising automatically ascertaining said measure of overlap between said first and second portions of said given area.

27. A method for automatically orienting passive motion detection sensors according to claim 23 and also comprising displaying said superimposed image of said at least said first portion of said given area to a user, thereby enabling said user to ascertain said measure of overlap between said first and second portions of said given area.

28. A method for automatically orienting passive motion detection sensors according to claim 23 and also comprising, responsive to said ascertaining said measure of overlap between said first and second portions of said given area, communicating with said at least one passive motion detection sensor, and facilitating remotely controlling orientation thereof by a user, said at least one passive motion detection sensor comprising remote control functionality operable for facilitating remote controlling thereof.

29. A method for automatically orienting passive motion detection sensors according to claim 23 and also comprising, responsive to said ascertaining said measure of overlap between said first and second portions of said given area, communicating with said at least one passive motion detection sensor and automatically remotely controlling orientation thereof, said at least one passive motion detection sensor comprising remote control functionality operable for facilitating remote controlling thereof.

\* \* \* \* \*